No. 712,186. Patented Oct. 28, 1902.
R. J. FLINN & G. P. ABORN.
FEED WATER REGULATOR.
(Application filed Sept. 11, 1901.)
(No Model.) 4 Sheets—Sheet 1.
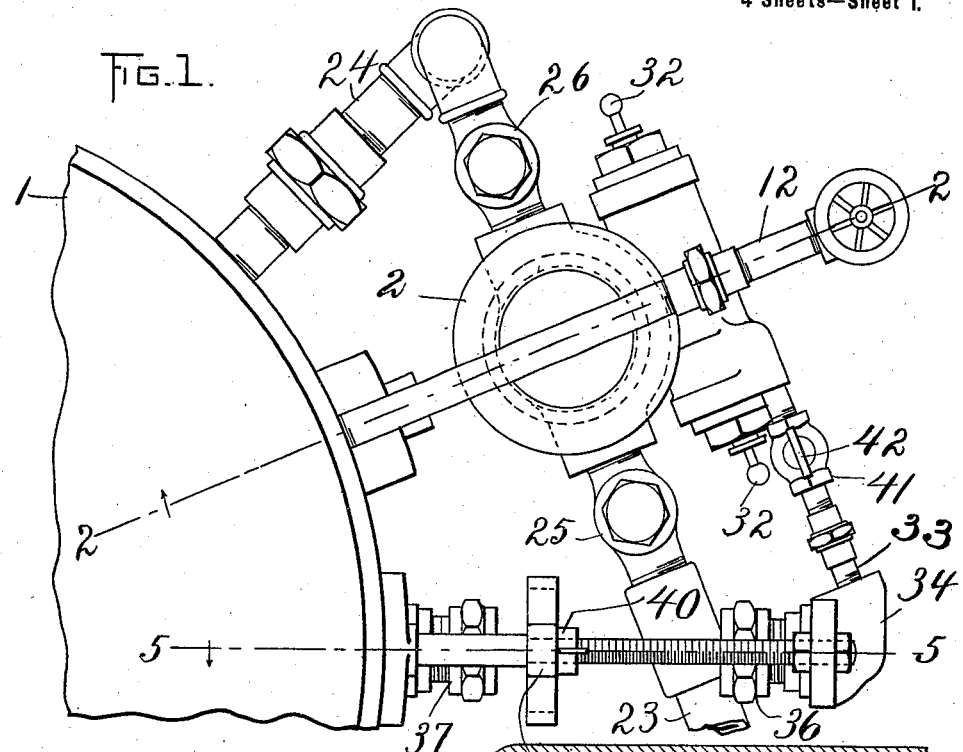
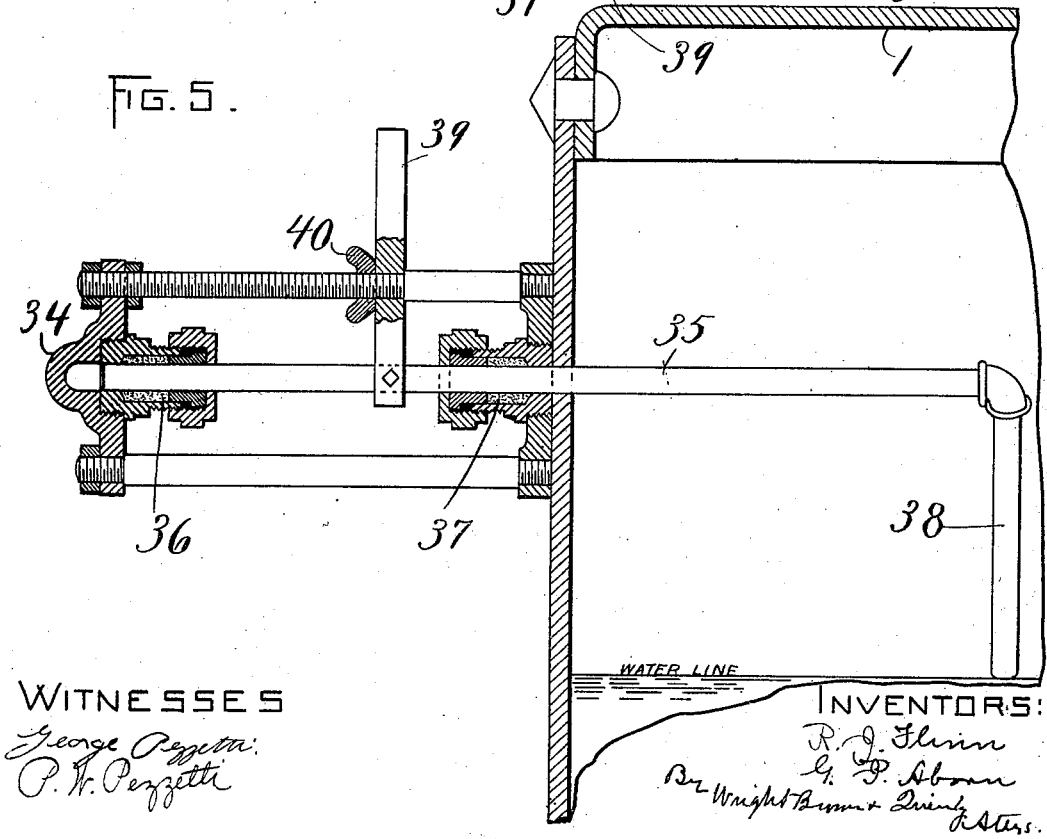

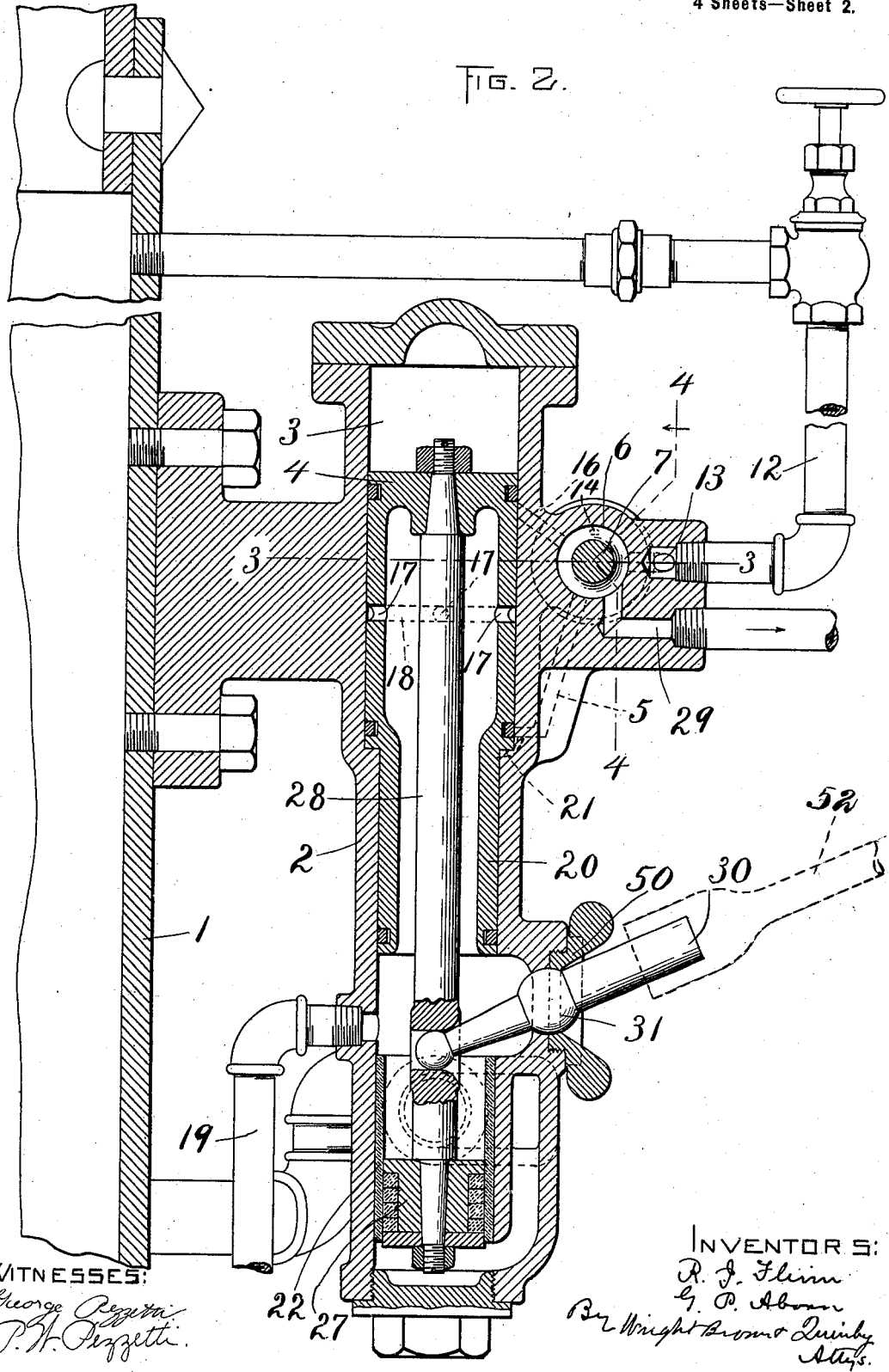

No. 712,186. Patented Oct. 28, 1902.
R. J. FLINN & G. P. ABORN.
FEED WATER REGULATOR.
(Application filed Sept. 11, 1901.)
(No Model.) 4 Sheets—Sheet 3.
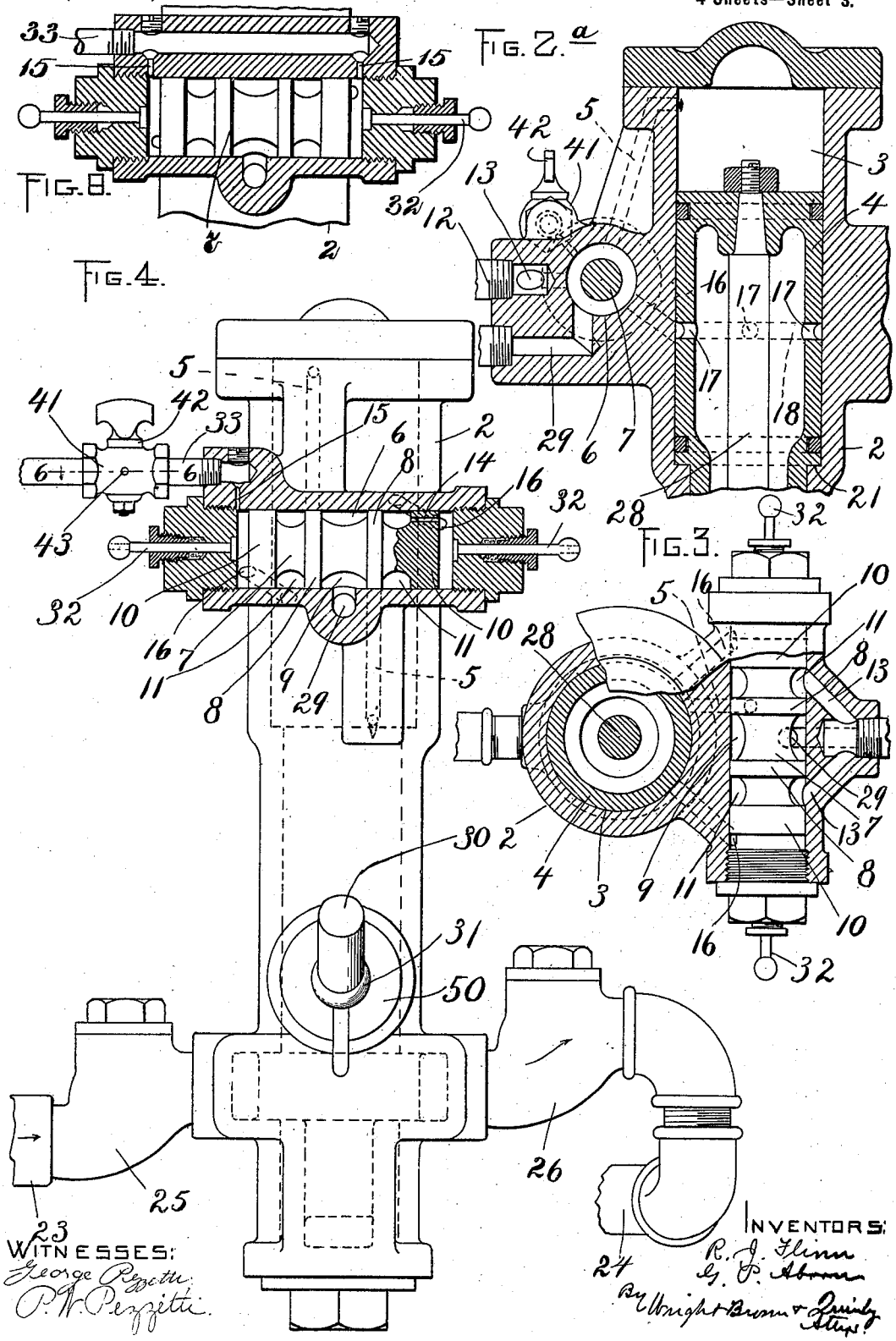

No. 712,186. Patented Oct. 28, 1902.
R. J. FLINN & G. P. ABORN.
FEED WATER REGULATOR.
(Application filed Sept. 11, 1901.)
(No Model.) 4 Sheets—Sheet 4.
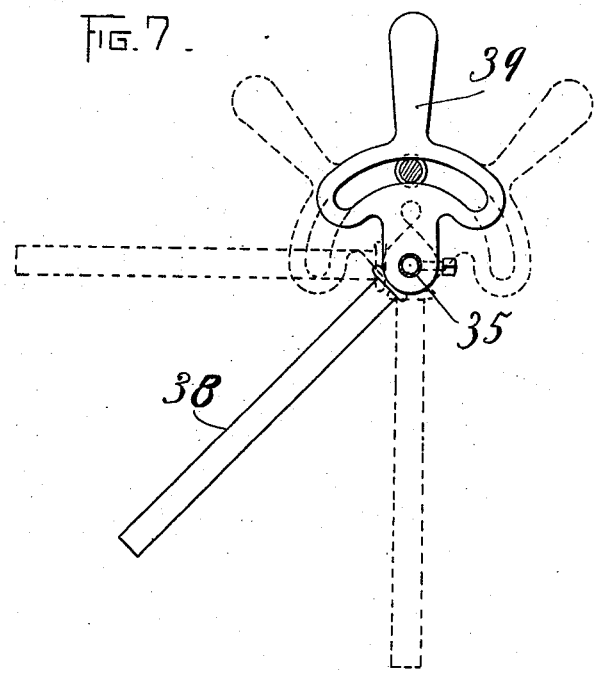
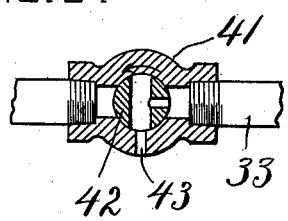
WITNESSES:
INVENTORS:

UNITED STATES PATENT OFFICE.

RICHARD J. FLINN AND GEORGE P. ABORN, OF BOSTON, MASSACHUSETTS.

FEED-WATER REGULATOR.

SPECIFICATION forming part of Letters Patent No. 712,186, dated October 28, 1902.

Application filed September 11, 1901. Serial No. 75,044. (No model.)

*To all whom it may concern:*

Be it known that we, RICHARD J. FLINN and GEORGE P. ABORN, of Boston, in the county of Suffolk and State of Massachusetts, have invented certain new and useful Improvements in Feed-Water Regulators, of which the following is a specification.

This invention relates to devices for feeding water to a boiler or other receptacle by means of a feed-pump.

The invention has for its object to provide improved means for automatically regulating the performance of the pump in accordance with the height of the water in the boiler or other receptacle; and to this end it consists in certain improvements hereinafter described and claimed.

The invention further consists in improvements in the steam ends or engines of pumps and similar apparatus, which improvements have for their object to simplify the construction of said engines.

Of the accompanying drawings, Figure 1 represents a plan view of a portion of a boiler provided with our improved feed-water regulator. Fig. 2 represents a section on the line 2 2 of Fig. 1. Fig. 2ª represents a partial section on the same line looking in the opposite direction. Fig. 3 represents a section on the line 3 3 of Fig. 2. Fig. 4 represents a section on the line 4 4 of Fig. 2. Fig. 5 represents a section on the line 5 5 of Fig. 1. Fig. 6 represents a sectional view of the stop and waste cock on the line 6 6 of Fig. 4. Fig. 7 represents a detail elevation of the level-changing device. Fig. 8 represents a sectional view showing a modified port arrangement for controlling the working valve.

The same reference characters indicate the same parts in all the figures.

Referring to the drawings, 1 represents a boiler, to which is fixed a pumping apparatus comprising a casing 2, having the engine or steam end in its upper portion and the pumping or water end in its lower portion. The steam end comprises a working cylinder 3, containing a working piston 4 and having steam-admission ports 5 5, opening, respectively, at the upper and lower ends of said cylinder and leading to a horizontal cylindrical chamber 6, containing the working valve 7. This valve is provided with two middle flanges 8 8, fitting the valve-cylinder, and between which is a recessed portion 9, and two end flanges 10 10, fitting the cylinder, and between which and the flanges 8 are recessed portions 11 11.

12 is a steam-supply pipe connecting at one end with the boiler and at its opposite end with two ducts 13 13, whose inner ends are continuously in register with the recesses 11 11.

29 is an exhaust-duct whose inner end is continuously in register with the recess 9. When the valve 7 is in a central position, the flanges 8 8 cover the ends of both of the admission-ports 5 5, and on either side of said central position the one or the other of these ports is open to the recess 9, while the opposite one is open to one of the recesses 11.

The extremities of the valve-chamber 6 constitute valve-operating cylinders, to which steam is continuously supplied through narrow ducts 14 15, the duct 14 in the embodiment shown in Figs. 1 to 8 being shown as passing through one of the end flanges 10 of the valve and the duct 15 as formed in the valve-casing.

16 16 are two exhaust-ducts connecting the ends of the valve-chamber 6 with the interior of the working cylinder 3. The working piston 4 is hollow, and in its walls are formed exhaust-ports 17 17, connected by a circumferential groove 18. Leading from the intermediate portion of the casing 2 is an exhaust and drain pipe 19 open to the interior of the piston 4. At the two ends of its stroke piston 4 brings its groove 18 into register, respectively, with the upper and lower exhaust-ducts 16 16. The lower end of the piston is formed with a guiding-stem portion 20, at the upper end of which is a horizontal shoulder 21. On the downstroke the steam acts against the full area of the upper end of piston 4 to force the feed-water into the boiler; but on the upstroke, which is a suction-stroke, (the pump being single-acting,) the piston has only to overcome the weight and friction of the moving parts and the steam acts only against the area of the shoulder 21.

22 is the pump-cylinder, to which are connected the suction and delivery pipes 23 24, provided with check-valves 25 26, and 27 is the pump-piston, rigidly connected by a rod 28 with the working-piston 4. The suction-pipe 23 connects with a suitable source of water-supply, and the delivery-pipe 24 leads to the boiler.

We have shown a lever 30 pivoted at 31 to the casing 2 and engaged at its inner end with the piston-rod 28, the said lever forming an auxiliary device for operating the pump, adapted to be actuated by hand or by power. Part of the bearing of this lever is formed by a removable apertured cap 50. The lever 30 may be removed when the pump is running normally under steam and a solid cap substituted for the cap 50, or it may be left in place. In the latter case the lever 30 is preferably short, as shown in the drawings, and an operating extension (indicated in dotted lines at 52 in Fig. 2) is coupled to it when hand-power is to be applied. The lever 30 requires no stuffing-box, as it enters a chamber which is free from pressure, and it operates with very little resistance from friction.

The operation is as follows: Supposing the piston 4 to be in its lowermost position and the valve 7 at the left-hand end of its stroke, the lower admission-port 5 will then be open to the right-hand steam-recess 11 of the valve, and the steam admittted to the lower end of the cylinder 3 will cause the piston to rise to the upper end of its stroke. The steam above the piston will be simultaneously exhausted through the upper admission-port 5 by way of the central recess 9 of the valve and the exhaust-duct 29. The valve 7 stays at the left-hand end of its stroke until the piston 4 has finished its upward stroke. Since the groove 18 is thereby brought into register with the upper one of the exhaust-ducts 16, leading from the right-hand end of the valve-chamber 6, the steam-pressure in front of the right-hand piston 10 will then be relieved through the interior of the piston 4 and the exhaust-pipe 19, and the preponderance of steam-pressure behind the left-hand piston 10 will force the valve quickly to the right-hand end of its stroke. Steam is thereby admitted above the working piston 4 and exhausted from below it, and said piston makes its descending stroke, at the end of which the valve 7 moves back to the left.

It will be seen that the piston 4 constitutes a valve for the primary or working valve 7, which causes said valve 7 to be reciprocated by the steam-pressure and to alternately admit steam to and exhaust it from the respective ends of the working cylinder 3.

32 32 are packed plungers in the ends of the valve-chamber 6, whereby the valve may be manually moved in either direction in starting the pump.

The steam-duct 15 connects by a pipe 33 with an elbow 34, from which a pipe 35 runs horizontally into the boiler 1, said pipe passing through stuffing-boxes 36 37 on the elbow and boiler. The pipe 35 is provided with a downwardly-bent portion 38 within the boiler, and the position of the intake-orifice at the lower end of said bent portion determines the maximum water-level in the boiler in the manner presently described. Attached to the pipe 35 is a handle 39, whereby the pipe may be rotated and the elevation of its intake-orifice varied.

40 is a nut adapted to screw against the handle 39 and fix the pipe in different positions.

41 is a stop and waste cock located in the pipe 33 and having a suitable construction, such as that represented in Fig. 6, whereby in one position of its plug 42 a free passage is afforded through the pipe 33, while in the other position such passage is shut off and the duct 15 is opened to the atmosphere through the discharge-orifice 43 in the cock. In its normal position the plug 42 is turned at right angles to the position represented in Fig. 6 in the direction of the arrow. Steam is then continuously supplied through the duct 15 to the left-hand end of the valve-chamber 6 so long as the water-level in the boiler is below the intake of pipe 35. The valve 7 then operates normally, and the pump raises the level of the water in the boiler. As soon as the water reaches the level of the intake and covers the intake-orifice steam is shut off from the duct 15, and water is forced out through the pipe 35 and the duct 15 into the left-hand end of the valve-chamber. The water flows more slowly through the constricted passage 15 and out through the exhaust-port 16 than does the steam, and this will slow down the valve 7 and diminish the supply of water furnished by the pump. Should the valve 7 stick in the middle of its stroke it may be forced to the left-hand end of its stroke by turning the plug 42 of the stop and waste cock to the position represented in Fig. 6, whereby the steam-supply is shut off from the left-hand end of the valve-cylinder and said end opened to the atmosphere. Fig. 9 illustrates a modification in which both of the cylinder-spaces at the ends of chamber 6 are supplied with steam through narrow ducts 15 in the casing of the valve-chamber. The stop and waste cock in the pipe 33 is here omitted. In providing these steam-ducts in the casing instead of in the valve and separating the steam-supply for actuating the valve 7 from the steam-supply for actuating the working piston 4 we allow for a separate control of the valve-steam by permitting the entrance of water into the chamber 6 to slow down the valve without affecting the main-cylinder steam-supply.

An important feature of our invention is the absence of stuffing-boxes in the steam and water cylinders. The inner ends of these cylinders are open to the central space of the casing 2, and any leakage into said space past either the steam or water piston finds an exit through the drain-pipe 19. The construction is also very simple, compact, and inexpensive to manufacture.

We claim—

1. In a boiler-feed apparatus, the combination of the boiler, the feed-pump, an engine for driving said pump, the working valve of said engine, a conduit connection made with the steam-space of the boiler for supplying steam to operate the engine, valve-controlled pressure utilizing means for driving said working valve, and an independent conduit connection made with the normal water-line level of the boiler for supplying steam or water to said valve-driving means.

2. In a boiler-feed apparatus, the combination of the boiler, the feed-pump, an engine for driving said pump, the working valve of said engine, a cylinder and piston for driving said valve in one direction, provisions for driving it in the opposite direction, a conduit connection from the boiler to said cylinder, and a stop and waste valve in said connection having provisions for maintaining the continuity of said connection in one position and for shutting the connection on the boiler side and discharging the cylinder in another position.

3. In a pumping apparatus, the combination of a casing formed with engine and pump cylinders and a chamber intermediate the same, a moving structure including the engine and pump pistons and a stem connection between said pistons traversing the said chamber, the working valve of the engine, means for driving said valve by fluid-pressure, provisions controlled by the movement of said moving structure for exhausting the valve-driving means into said intermediate chamber, and a drainage-outlet leading from said chamber.

4. In a pumping apparatus, the combination of a casing formed with engine and pump cylinders and a closed chamber intermediate the same, a moving structure including the engine and pump pistons and a stem connection between said pistons, and an operating lever fulcrumed in the wall of said chamber and engaging said connection.

In testimony whereof we have affixed our signatures in presence of witnesses.

RICHARD J. FLINN.
GEORGE P. ABORN.

Witnesses for Flinn:
R. M. PIERSON,
E. BATCHELDER.

Witnesses for Aborn:
M. B. MAY,
R. M. PIERSON.